United States Patent Office 3,261,367
Patented July 19, 1966

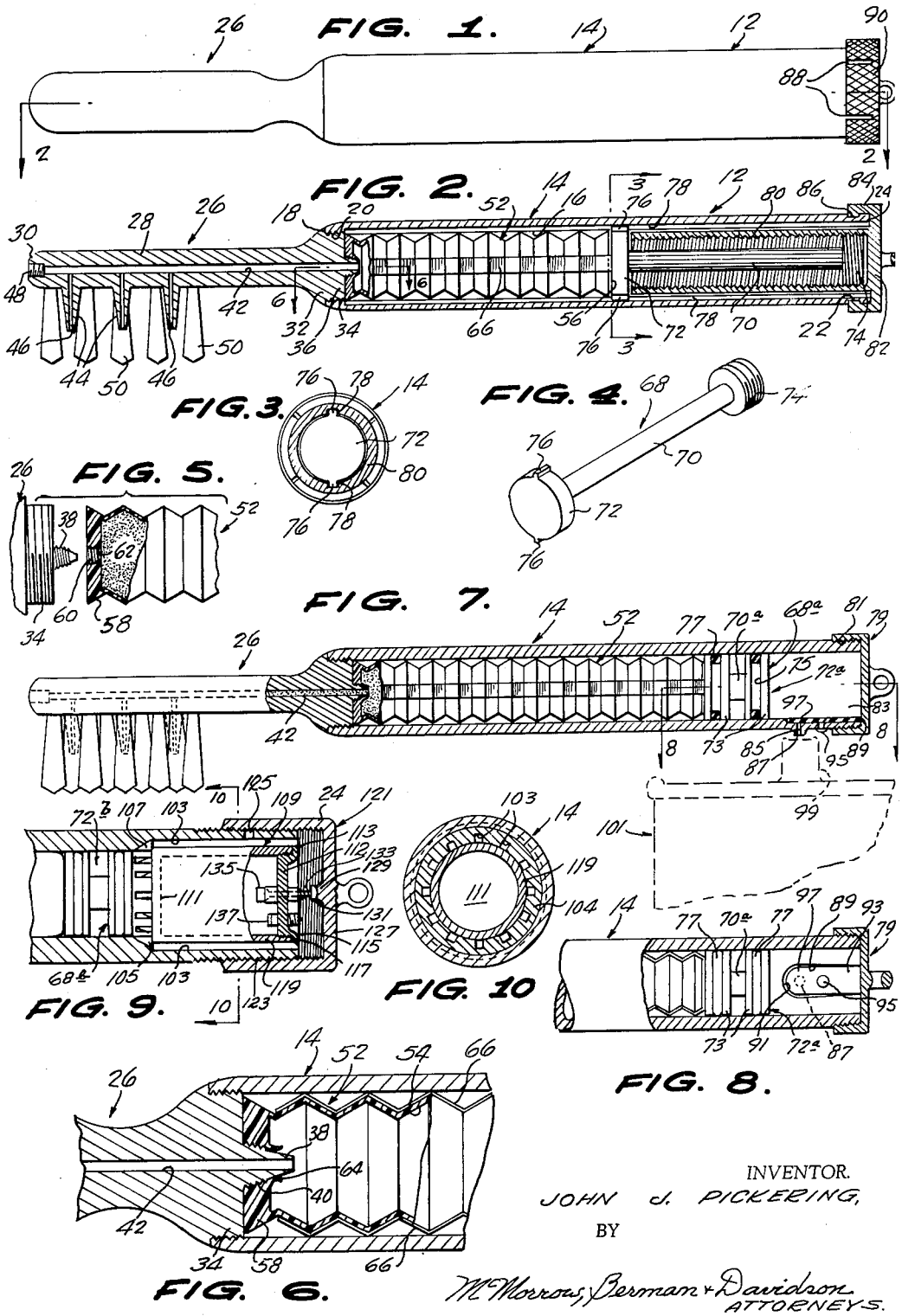

3,261,367
CARTRIDGE-LOADED PRESSURE FEED
TOOTHBRUSHES
John J. Pickering, 102 Barrett Ave.,
North Providence, R.I.
Filed Sept. 13, 1963, Ser. No. 308,750
4 Claims. (Cl. 132—84)

This invention relates to novel cartridge-loaded pressure feed toothbrushes.

The primary object of the invention is the provision of efficient, compact, and easily operated devices of the kind indicated, which are especially practical for away-from-home use because they eliminate the carrying and servicing of separate brushes and toothpaste containers.

Another object of the invention is the provision of devices of the character indicated above which comprise elongated hollow handles, in which endwise collapsible toothpaste cartridges are removably engaged, brush heads adapted to be screwed on one end of the handles and having pointed tubular nipples adapted to penetrate the adjacent ends of the cartridges, as the brush heads are screwed home, pistons in the handles engaged with the other ends of the cartridges, and means for advancing the pistons for collapsing the cartridges for feeding toothpaste to the brush heads.

A further object of the invention is the provision of uncomplex devices of the character indicated above, which are composed of a small number of simple and easily assembled components.

A still further object of the invention is the provision, in devices of the character indicated above, of endwise collapsible cartridges, having accordion sidewalls, with crimped leaf springs secured to the sidewalls and serving to assist in the collapsing of the cartridges and the discharge of toothpaste therefrom.

Other important objects and advantageous features of the invention will be apparent from the following description and the accompanying drawings, wherein, for purposes of illustration only, specific forms of the invention are set forth in detail.

In the drawings:

FIGURE 1 is a side elevation of a device of the present invention;

FIGURE 2 is a longitudinal section taken on the line 2—2 of FIGURE 1, showing the cartridge in a penetrated but uncollapsed condition;

FIGURE 3 is a transverse section taken on the line 3—3 of FIGURE 2;

FIGURE 4 is a perspective view of the piston assembly of FIGURES 1 to 3;

FIGURE 5 is an enlarged fragmentary side elevation, partly broken away and in section, showing the brush head positioned preliminary to being moved to cartridge-penetrating position;

FIGURE 6 is an enlarged fragmentary longitudinal section, taken on the line 6—6 of FIGURE 2, showing the cartridge penetrated by the tubular nipple of the brush head;

FIGURE 7 is a view, like FIGURE 2, of an external air-pressure operated device of the invention, a source of air under pressure being shown in phantom lines, applied to the air intake of the device;

FIGURE 8 is a fragmentary longitudinal section taken on the line 8—8 of FIGURE 7;

FIGURE 9 is an enlarged fragmentary longitudinal section taken through an internal air-pressure operated device of the present invention; and, FIGURE 10 is a transverse section taken on the line 10—10 of FIGURE 9.

Referring in detail to the drawings, the first to FIGURES 1 through 6, the device illustrated therein and generally designated 12, comprises an elongated cylindrical tubular handle 14, having a smooth uniform diameter bore 16 extending therethrough. The bore 16 is reduced in diameter, at the forward end 18 of the handle and internally threaded, as indicated at 20. The handle 14 is formed with an external annular groove 22, close to its rear end 24.

A brush head 26 comprises an elongated relatively small diameter rod 28 having a rounded forward end 30. At its rear end, the rod 28 merges axially into a frusto-conical enlarged diameter rear end portion 32, on which is an axial reduced diameter, externally threaded plug 34. An annular shoulder 36 is defined by the plug 34.

The plug 34 is formed with a relatively small diameter axial, rearwardly tapering nipple 38, which is externally threaded, as indicated at 40. An axial bore 42 extends through the rod 28, the rear end portions 32, the plug 34, and the nipple 38.

Longitudinally spaced, outwardly tapering feeder fingers 44, project laterally from the brush head rod 28, and have bores 46 extending therethrough which are in communication with the rod bore 42. The forward end of the rod bore 42 is normally closed by a threaded plug 48, which is removable for cleaning the bore 42. Bristle tufts 50 are secured to the rod between adjacent fingers 44, and at the outer side of the foremost and the rearmost fingers. The bristle tufts 50 are substantially longer than the fingers 44.

Contained within the handle 14 is a removable toothpaste cartridge 52, which has a flexible accordion sidewall 54, of suitable flexible material. The rear end of the cartridge 52 is closed by a rear end wall 56. The forward end of the cartridge is closed by a rigid forward end wall 58 of substantial thickness, which is formed with a tapered axial, internally threaded socket 60. The rear end of the socket 60 is closed by a relatively thin end wall 62, which, as shown in FIGURE 6, when penetrated by the brush head nipple 38, breaks and provides an opening 64, which affords communication between the interior of the cartridge 52 and the brush head bore 42. This penetration is produced by screwing the brush head plug 34 into the forward end of the handle 14 until the shoulder 36 engages the forward end 18 of the handle.

Crimped longitudinal leaf springs 66 are suitably secured to the outer surface of the cartridge sidewall 54, preferably in diametrically opposed relationship, and follow the contour of the sidewall 54, and are biased to assist in the endwise collapse of the cartridge, for discharging toothpaste contained in the cartridge, through the brush head bore 42, and the bores of the fingers 44, onto the bristle tufts 50.

Manually operated means for exerting forward collapsing pressure on the read end of the cartridge comprises a piston assembly 68, composed of a reduced diameter axial rod 70 having an enlarged diameter piston 72, on its forward end, and a smaller diameter externally screw threaded head 74, on its rear end.

The piston 72 has a pair of diametrically opposed guide lugs 76 which slide in longitudinal guide grooves 78, formed in the wall of the handle 14 and extending to the rear end 24 of the handle 14.

An internally threaded tube 80 is rotatably engaged in the handle 14 through the rear end thereof, which is threaded on the threaded head 74 of the piston assembly 68. The outer end of the tube 80 is closed by an enlarged diameter rear end wall 82 which bears against the rear end of the handle, and which has a forwardly extending annular flange 84 which is rotatably engaged with the outer surface of the handle 14. The flange 84 has, at its forward end, an internal annular rib 86 which is rotatably confined in the external groove 22 of the handle. To enable the flange 84 and the rib 86 to be snapped over the rear end of the handle 14, for positioning the rib in the groove, the flange and the rib are formed, at regular intervals therearound, with longitudinal slots 88, which open to the forward end of the flange 84, as seen in FIGURE 1.

In use and operation, controlled forward collapse of the cartridge 52 is produced by rotating the threaded tube 80, by grasping the knurled exterior surface 90 of the flange 84 and rotating the tube 80, in a direction to move the piston assembly forwardly against the rear end of the cartridge.

The device of FIGURES 7 and 8, generally designated 122, is similar to the device of FIGURES 1 to 6, except for an external air-pressure operated free-floating piston assembly 68a and its accessories. The piston assembly 68a comprises a dual piston 72a composed of spaced piston heads 73, 73 spaced and connected by a reduced diameter piston rod 70a. The piston heads 73 have external grooves 75, in which are secured compressible pressure-resistant piston rings 77. The dual piston 72a is relatively short, and when it is positioned forwardly in the handle bore 16, against the rear end of the cartridge 52, leaves between the piston 72a, and an imperforate cap 79, threaded, as indicated at 81, on the rear end of the handle, an air pressure chamber 83.

An air pressure inlet nipple 85 having a bore 87 leading into the chamber 83, is provided on the handle sidewall. The handle sidewall is formed with a longitudinal recess 89, leading forwardly from the rear end 24 of the handle 14, to a rounded forward end 91, concentric with the nipple 85. A resilient and compressible flap valve 93 is fixed in the recess 89, as by means of a rivet 95 traversing the same behind the nipple, and has a free forward end portion 97 overlying the nipple bore 87.

In operation, air under pressure is introduced into the chamber 83, for driving the piston 72a forwardly in the handle 14 for collapsing the cartridge, by applying a suitable external source of air pressure to the inlet nipple 85, such as the discharge spout 99 of an air pressure can 101, such as is in use for inflating vehicle tires. As air pressure enters the inlet nipple 85, the flap valve portion 97 is pushed away from the nipple bore 87 and enters the chamber and drives the piston 72a forwardly. As soon as the can spout 99 is withdrawn from the inlet nipple 85, the air pressure within the handle 14 closes the flap valve and the air pressure is maintained in the handle. This air pressure can be relaxed by backing the cap 79 off the handle 14.

The device of FIGURES 9 and 10, involving manually produced air pressure operation of another form of piston assembly 68b, comprises the same forms of brush head, handle, and cartridge as the above described devices.

The piston assembly 68b comprises a dual free-floating piston 72b, like the piston 72a of FIGURES 7 and 8. The bore 16 of the handle 14, instead of being smooth, is formed, at the rear end thereof, with equally circumferentially spaced longitudinal grooves 103, which open to the rear end 24 of the handle 14. At their forward ends, the grooves 103 terminate in laterally inwardly and forwardly angled portions 105, which define a stop shoulder 107.

A longitudinally slidable tubular air container 109 slides in the grooved bore of the handle, and has an imperforate forward end wall 111 which normally abuts the stop shoulder 107. The rear end of the container 109 is closed by a rear end wall 112, which is threaded into the container, as indicated at 113, and which has an annular flange 115 which abuts the rear end 117, of the sidewall 119 of the container. The sidewall 119 and the bore grooves 103 define air pressure transfer passages between the space between the piston 72b and the cartridge 52, and the space between the rear end of the container 109 and a cap 121, which is threaded, as indicated at 123, onto the rear end of the handle 14. A pressure venting port 125 is provided in the handle sidewall, which opens to at least one of the grooves 103, which is normally covered, as shown in FIGURE 9, by the flange of the cap 121.

The web 127 of the cap 121 is provided with an axial forwardly extending boss 129, with which is engaged a head 131 on the spring-pressed stem 133 of a pressure outlet valve 135, which provides communication between the interior of the container 109 and the rear ends of the grooves 103, for driving the piston 72b forwardly for collapsing the cartridge 52, when the cap 121 is threaded forwardly on the handle 14 and pushes the valve stem 133 forwardly to open position.

An inlet valve 137, like a tire valve, traverses the rear end wall 127 of the container 109, to provide for filling the container 109 with air under pressure, by the application of a suitable pressure source thereto, before the cap 121 is put on the handle 14.

In operation, the desired amount of toothpaste is adapted to be discharged by the fingers 44 onto the bristle tufts 50, by screwing the cap 121 forwardly on the handle 14, so that the valve 135 is opened to the degree necessary to force air through the grooves 103 against the rear end of the piston 72b. When the desired discharge or feeding of toothpaste has been obtained, the cap 121 is backed off far enough to enable the valve 135 to close and cut off the pressure behind the piston 72b. These operations are repeated until the cartridge is fully collapsed and is emptied of toothpaste.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A cartridge-loaded pressure operated toothbrush comprising a tubular handle having forward and rear ends, a brush head on the forward end of the handle and having an axial rearwardly tapered nipple on its rear end, said brush head having a longitudinal bore extending therethrough, means closing the forward end of the bore, bristle means on a side of the brush head, means providing for discharge of toothpaste from said bore to the bristle means, an endwise collapsible toothpaste containing cartridge positioned within the handle behind the brush head, said cartridge having a closed rear end, a rigid forward end wall closing the forward end of the cartridge, said forward end wall being formed with an axial tapered socket, a relatively thin frangible rear end wall closing the rear end of the socket, said brush head being threaded on the handle and adapted to be threaded rearwardly on the handle to push the brush head nipple into the cartridge socket and break an opening in the frangible rear wall of the socket so as to provide communication between the interior of the cartridge and the brush head bore, and forward pressure exerting means comprising a member working endwise in the handle at the rear end thereof and engaged with the rear end of the cartridge for collapsing the cartridge forwardly and discharging toothpaste therefrom to the brush head bore as the brush head is threaded rearwardly on the handle, said pressure exerting means comprising a piston assembly sliding in the bore of the handle behind the cartridge, said piston assembly comprising a piston engaged with the rear end of the cartridge and sliding in the handle bore, opposed guide grooves in the handle bore, guide lugs on the piston sliding in the grooves, a reduced diameter piston rod fixed to the piston and extending rearwardly therefrom, an externally threaded head fixed on the rear end of the piston rod and concentrically spaced from the sidewall of the handle, an internally threaded tube passing through the rear end of the handle into the space between the handle sidewall and the threaded head and threaded on the threaded head, an end wall closing the rear end of the tube and abutting the rear end of the handle, said tube end wall having a forwardly extending annular flange turning on the exterior surface of the handle, said flange having an internal annular rib, and the handle having an external annular groove in which said rib is confined.

2. A cartridge-loaded pressure operated toothbrush comprising a tubular handle having forward and rear ends, a brush head on the forward end of the handle and having an axial rearwardly tapered nipple on its rear end, said brush head having a longitudinal bore extending therethrough, means closing the forward end of the bore, bristle means on a side of the brush head, means providing for discharge of toothpaste from said bore to the bristle means, an endwise collapsible toothpaste containing cartridge positioned within the handle behind the brush head, said cartridge having a closed rear end, a rigid forward end wall closing the forward end of the cartridge, said forward end wall being formed with an axial tapered socket, a relatively thin frangible rear end wall closing the rear end of the socket, said brush head being threaded on the handle and adapted to be threaded rearwardly on the handle to push the brush head nipple into the cartridge socket and break an opening in the frangible rear wall of the socket so as to provide communication between the interior of the cartridge and the brush head bore, and forward pressure exerting means comprising a member working endwise in the handle at the rear end thereof and engaged with the rear end of the cartridge for collapsing the cartridge forwardly and discharging toothpaste therefrom to the brush head bore as the brush head is threaded rearwardly on the handle, said pressure exerting means comprising a piston assembly in the bore of the handle behind the cartridge and engageable with the rear end of the cartridge, said piston assembly consisting of a free-floating piston shorter than the space between the rear end of the cartridge and the rear end of the handle, an imperforate cap securably engaged on and closing the rear end of the handle and defining an air pressure chamber in the handle between the cap and the piston, the sidewall of the handle between the piston and the cap being formed with a longitudinal recess, an external air pressure inlet on the handle sidewall having a bore opening to the recess, an external source of air under pressure being adapted to be applied to the inlet nipple for filling the chamber with an under pressure for driving the piston forwardly for collapsing the cartridge, a flap valve secured in said recess and having a free end portion covering the inlet nipple bore.

3. A cartridge-loaded pressure operated toothbrush comprising a tubular handle having forward and rear ends, a brush head on the forward end of the handle and having an axial rearwardly tapered nipple on its rear end, said brush head having a longitudinal bore extending therethrough, means closing the forward end of the bore, bristle means on a side of the brush head, means providing for discharge of toothpaste from said bore to the bristle means, an endwise collapsible toothpaste containing cartridge positioned within the handle behind the brush head, said cartridge having a closed rear end, a rigid forward end wall closing the forward end of the cartridge, said forward end wall being formed with an axial tapered socket, a relatively thin frangible rear end wall closing the rear end of the socket, said brush head being threaded on the handle and adapted to be threaded rearwardly on the handle to push the brush head nipple into the cartridge socket and break an opening in the frangible rear wall of the socket so as to provide communication between the interior of the cartridge and the brush head bore, and forward pressure exerting means comprising a member working endwise in the handle at the rear end thereof and engaged with the rear end of the cartridge for collapsing the cartridge forwardly and discharging toothpaste therefrom to the brush head bore as the brush head is threaded rearwardly on the handle, said pressure exerting means comprising a piston assembly in the bore of the handle behind the cartridge and engageable with the rear end of the cartridge, said piston assembly consisting of a free-floating piston shorter than the space between the rear end of the cartridge and the rear end of the handle, an imperforate cap securably engaged on and closing the rear end of the handle and defining an air pressure container in the handle between the cap and the piston, the sidewall of the handle between the piston and the cap being formed with a longitudinal recess, an external air pressure inlet on the handle sidewall having a bore opening to the recess, an external source of air under pressure applied to the inlet nipple for filling the container with air under pressure for driving the piston forwardly for collapsing the cartridge, a flap valve secured in said recess and having a free end portion covering the inlet nipple bore, said piston comprising a pair of longitudinally spaced heads, a reduced diameter piston rod spacing and connecting the heads, said heads having peripheral grooves containing piston sealing rings.

4. A cartridge-loaded pressure operated toothbrush comprising a tubular handle having forward and rear ends, a brush head on the forward end of the handle and having an axial rearwardly tapered nipple on its rear end, said brush head having a longitudinal bore extending therethrough, means closing the forward end of the bore, bristle means on a side of the brush head, means providing for discharge of toothpaste from said bore to the bristle means, an endwise collapsible toothpaste containing cartridge positioned within the handle behind the brush head, said cartridge having a closed rear end, a rigid forward end wall closing the forward end of the cartridge, said forward end wall being formed with an axial tapered socket, a relatively thin frangible rear end wall closing the rear end of the socket, said brush head being threaded on the handle and adapted to be threaded rearwardly on the handle to push the brush head nipple into the cartridge socket and break an opening in the frangible rear wall of the socket so as to provide communication between the interior of the cartridge and the brush head bore, and forward pressure exerting means comprising a member working endwise in the handle at the rear end thereof and engaged with the rear end of the cartridge for collapsing the cartridge forwardly and discharging toothpaste therefrom to the brush head bore as the brush head is threaded rearwardly on the handle, said pressure exerting means comprising a free-floating piston sliding in the handle bore behind and engageable with the rear end of the cartridge for collapsing the cartridge forwardly, the rear part of the bore of the handle being formed with internal longitudinal grooves opening to the rear end of the handle and terminating at their forward ends at the rear side of the piston, a closed hollow cylindrical air container engaged in said rear part of the handle bore, said container having a rear end wall, the handle sidewall being formed with a pressure relief port located near the rear end of the handle and communicating with at least one of the grooves, an imperforate cap threaded on the rear end of the handle, said cap having a web spaced rearwardly from the air container and a forwardly extending flange normally closing said relief port, an air inlet valve extending through the rear end wall of the container to which an external source of air under pressure is connected with the cap removed for filling the container with air under pressure, and a normally spring-closed pressure transfer valve extending supportably through the rear end wall of the container, said transfer valve having a rearwardly extending stem, said cap being adapted to be threaded forwardly on the handle to engage and move the valve stem forward to open position and open the valve so as to effect a transfer of air under pressure from the container through the grooves to the rear end of the piston.

References Cited by the Examiner

UNITED STATES PATENTS

| | | | |
|---|---|---|---|
| 520,593 | 5/1894 | Hager | 132—84 |
| 1,340,043 | 5/1920 | Grace | 132—84 |
| 1,780,066 | 10/1930 | Christian | 15—557 |
| 2,807,818 | 10/1957 | Taylor | 132—84 |
| 2,978,722 | 4/1961 | Kusakabe | 15—555 |
| 3,021,850 | 2/1962 | Smith et al. | 132—84 |
| 3,137,305 | 6/1964 | Jones. | |

RICHARD A. GAUDET, *Primary Examiner.*

G. E. McNEILL, *Assistant Examiner.*